US009179235B2

(12) United States Patent
Duwenhorst

(10) Patent No.: US 9,179,235 B2
(45) Date of Patent: Nov. 3, 2015

(54) META-PARAMETER CONTROL FOR DIGITAL AUDIO DATA

(75) Inventor: Sven Duwenhorst, Hamburg (DE)

(73) Assignee: Adobe Systems Incorporated, San Jose, CA (US)

( * ) Notice: Subject to any disclaimer, the term of this patent is extended or adjusted under 35 U.S.C. 154(b) by 1561 days.

(21) Appl. No.: 12/267,108

(22) Filed: Nov. 7, 2008

(65) Prior Publication Data

US 2013/0166050 A1    Jun. 27, 2013

(51) Int. Cl.
*G06F 17/00* (2006.01)
*H04S 1/00* (2006.01)
*H04N 21/439* (2011.01)
*H04R 29/00* (2006.01)

(52) U.S. Cl.
CPC .............. *H04S 1/007* (2013.01); *H04N 21/439* (2013.01); *H04R 29/008* (2013.01); *H04S 2400/13* (2013.01)

(58) Field of Classification Search
CPC .... H04N 21/439; H04R 29/008; H04S 1/007; H04S 2400/13
USPC .......................................................... 700/94
See application file for complete search history.

(56) References Cited

U.S. PATENT DOCUMENTS 4,412,100 A * 10/1983 Orban ............................ 381/100
4,460,871 A * 7/1984 Orban ............................ 327/309
5,231,308 A 7/1993 Fisch
6,057,829 A * 5/2000 Silfvast .......................... 345/156
6,326,538 B1 * 12/2001 Kay ................................. 84/635
6,362,409 B1 * 3/2002 Gadre ............................. 84/603
6,438,241 B1 * 8/2002 Silfvast et al. ................ 381/119
7,078,608 B2 * 7/2006 Aiso et al. ........................ 84/625
7,755,526 B2 * 7/2010 Medina et al. ................ 341/144

(Continued)

FOREIGN PATENT DOCUMENTS

EP            0 614 331 B1    12/1996

OTHER PUBLICATIONS

Dolby DP 570 manual; copyright 2001.*

(Continued)

*Primary Examiner* — Paul McCord
(74) *Attorney, Agent, or Firm* — Wolfe-SBMC

(57) ABSTRACT

This specification describes technologies relating to modifying digital audio data using a meta-parameter. A method is provided that includes receiving digital audio data; receiving an input modifying a meta-parameter to a particular meta-parameter value associated with two or more parameters according to a particular mapping, each of the two or more parameters being associated with the digital audio data; modifying at least a first parameter of the two or more parameters based on the particular meta-parameter value and the particular mapping such that a first meta-parameter value causes a modification of the first parameter associated with a volume control of the digital audio data and a second meta-parameter value causes a modification of a second parameter of the two or more parameters associated with dynamic range control of the digital audio data; and generating modified digital audio data from the two or more modified parameters of the digital audio data.

18 Claims, 5 Drawing Sheets

(56) References Cited

U.S. PATENT DOCUMENTS

| | | | |
|---|---|---|---|
| 8,005,243 B2* | 8/2011 | Terada et al. | 381/119 |
| 8,014,549 B2* | 9/2011 | Kates | 381/316 |
| 2003/0009247 A1* | 1/2003 | Wiser et al. | 700/94 |
| 2003/0035555 A1* | 2/2003 | King et al. | 381/103 |
| 2005/0078840 A1* | 4/2005 | Riedl | 381/104 |
| 2005/0105115 A1* | 5/2005 | Hoshi | 358/1.9 |
| 2005/0231124 A1 | 10/2005 | Choi et al. | |
| 2007/0067055 A1* | 3/2007 | Terada | 700/94 |
| 2007/0235832 A1 | 10/2007 | Wang | |
| 2008/0004735 A1* | 1/2008 | Michener | 700/94 |
| 2008/0007332 A1* | 1/2008 | Dubowsky | 330/129 |
| 2008/0099887 A1 | 5/2008 | Song et al. | |
| 2008/0175415 A1* | 7/2008 | Kunimoto | 381/119 |
| 2009/0063159 A1* | 3/2009 | Crockett | 704/500 |
| 2009/0080135 A1 | 3/2009 | Major | |
| 2009/0138110 A1* | 5/2009 | Kohyama et al. | 700/94 |
| 2010/0014692 A1* | 1/2010 | Schreiner et al. | 381/119 |
| 2010/0109926 A1* | 5/2010 | Medina et al. | 341/144 |

OTHER PUBLICATIONS

Dolby DP570 specification sheet; Copyright 2004.*

Dolby DP600 manual; copyright 2007.*

Apple GarageBand AUMultibandCompressor: article copyright 2004 available at archive .org at least Nov. 1, 2007.*

TubeTechCompressor : available for sale at least Jan. 2009.*

TubeTechCompressor manual: available for sale at least Jan. 2009.*

Max/MSP user manual copyright and available for sale at least 2006.*

Adobe Audition Manual; copyright and available for sale 2003.*

International Searching Authority, International Search Report and Written Opinion, Appln No. PCT/US2009/057341, date of mailing May 20, 2010, 14 p.

German Office Action dated Apr. 14, 2014; issued in Appl. No. 112009005142.1; 4 pages.

* cited by examiner

META-PARAMETER CONTROL FOR DIGITAL AUDIO DATA

BACKGROUND

The present disclosure relates to editing audio signals.

Audio signals are associated with a number of different parameters. An audio signal has a level value based on energy contained in the audio signal. The level value is often referred to as a root-mean-square (RMS) value. The audio signal also has a peak value and a crest factor. The peak value represents the maximum amplitude value for the audio signal within a specified time (for example, one period of an audio waveform in the audio signal). The crest factor is calculated as the ratio of the peak value and the RMS value of the audio signal over a specified time.

Editing audio signals can be accomplished using signal processing techniques to generate particular audio effects. For example, the audio signal can be adjusted to increase across time (e.g., by increasing the overall intensity of the audio signal), also referred to as amplification or applying a gain to the audio signal.

Signal intensity can vary over time such that some points in time have a high signal intensity while other points in time have a low signal intensity. Additionally, one or more factors can affect audibility of the audio signal, including, for example, background noise, number of distinct audio signal sources, or individual signal intensities. An example of audio signals having different signal intensities is a movie. The voices of different actors located at different distances from a microphone result in differences in a number of aspects including tonality, intensity, or dynamics.

In general, dynamic range is the ratio between the smallest and largest possible values of a changeable parameter. In an audio signal, dynamic range represents the ratio of the loudest portion of the audio signal to the quietest portion of the signal. Sound effects in a movie can have high signal intensities, for example explosions or water rushing from a waterfall, which affect the audio properties of dialogue. Similarly, a movie can change tempo and volume accordingly, having its characters whisper through a scene after a loud action sequence, and vice versa. Conference calls can also present challenges, with distances from the microphone and unexpected distractions, e.g., other phone calls, office machines running, and emergency service vehicles traveling nearby. Commercials (e.g., radio or television) often have a higher level than the surrounding content causing a listener to reach for her volume control after she has set the volume for the content. Other factors may also exist that influence the recording of audio signals.

SUMMARY

This specification describes technologies relating to modifying digital audio data using a meta-parameter.

In general, one aspect of the subject matter described in this specification can be embodied in computer-implemented methods that include the actions of receiving digital audio data; receiving an input modifying a meta-parameter to a particular meta-parameter value, the meta-parameter being associated with two or more parameters according to a particular mapping, each of the two or more parameters being associated with the digital audio data; modifying at least a first parameter of the two or more parameters based on the particular meta-parameter value and the particular mapping such that a first meta-parameter value causes a modification of the first parameter associated with a volume control of the digital audio data and a second meta-parameter value causes a modification of a second parameter of the two or more parameters associated with dynamic range control of the digital audio data; and generating modified digital audio data from the two or more modified parameters of the digital audio data. Other embodiments of this aspect include corresponding systems, apparatus, and computer program products.

These and other embodiments can optionally include one or more of the following features. The method further includes a first range of values for the meta-parameter being mapped to the first parameter, and a second range of values for the meta-parameter being mapped to the second parameter. The method further includes the first and second meta-parameter ranges controlling the first and second parameters. The method further includes a third range of values for the meta-parameter being mapped to a third parameter. The method further includes the first range of values for the meta-parameter being associated with amplifying the digital audio data. The method further includes the second range of values for the meta-parameter being associated with upward compressing of the digital audio data.

The method further includes a user providing the input using a single user interface control. The method further includes comparing an amplitude of the digital audio data with the modified second parameter, when the digital audio data amplitude is within a second range of values for the meta-parameter. The comparing includes calculating an amplification difference between the digital audio data amplitude and the modified second parameter, comparing the amplification difference to a maximum amplification difference, and when the amplification difference is greater than the maximum amplification difference, decreasing the amplification difference to the maximum amplification difference. The method further includes detecting clippings from an amplitude of the modified digital audio data. The method further includes smoothing an amplitude envelope of the modified digital audio data. The method further includes applying look-ahead limiting to the modified digital audio data amplitude.

The method further includes the second meta-parameter range being set from 100 to 200. The method further includes the modification of the second parameter causing a modification of a third parameter associated with a frequency of the audio signal.

Particular embodiments of the subject matter described in this specification can be implemented to realize one or more of the following advantages. Multiple parameters can be adjusted easily using a single meta-parameter control. An audio system can intuitively modify the dynamic range of an audio signal in response to a user input to increase the volume of the signal. Audibility of audio signal portions having low intensity can be improved. In general, this can help increase the intelligibility of speech and increase perception of ambient sounds (e.g., footsteps, doors opening). The ability to enjoy a movie, television, or radio program without being exposed to unwanted levels of noise from explosions or advertising is also advantageous.

The details of one or more embodiments of the invention are set forth in the accompanying drawings and the description below. Other features, aspects, and advantages of the invention will become apparent from the description, the drawings, and the claims.

DETAILED DESCRIPTION

Typically, a volume control in a standard media player has a range from "0" to "10" with "0" indicating that no audio signal is being played and "10" indicating a maximum level for playing the audio signal, e.g., using linear amplification. Depending on the signal intensities present in the media being played, the media's audio signal is either too loud or not loud enough. For example, a movie with whispered conversations and explosions often causes a listener to frequently adjust the volume control on the media player, e.g., to reduce the level of the explosions or to increase the level of the dialogue.

In another example, a sleeping baby whom the listener does not want to disturb will require the media player to be set at a lower than typical volume level. The listener can adjust the volume control so that both the baby is not disturbed and the listener can understand the dialogue. Frequently adjusting the volume interrupts the listener's ability to suspend disbelief and enjoy a movie. Likewise, the listener of a conference call may wish to hear each speaker at a similar volume, particularly when one caller has a more sensitive microphone than another. Requiring the listener to change the position of the receiver from her ear is a cumbersome and undesirable solution.

Figure 1:
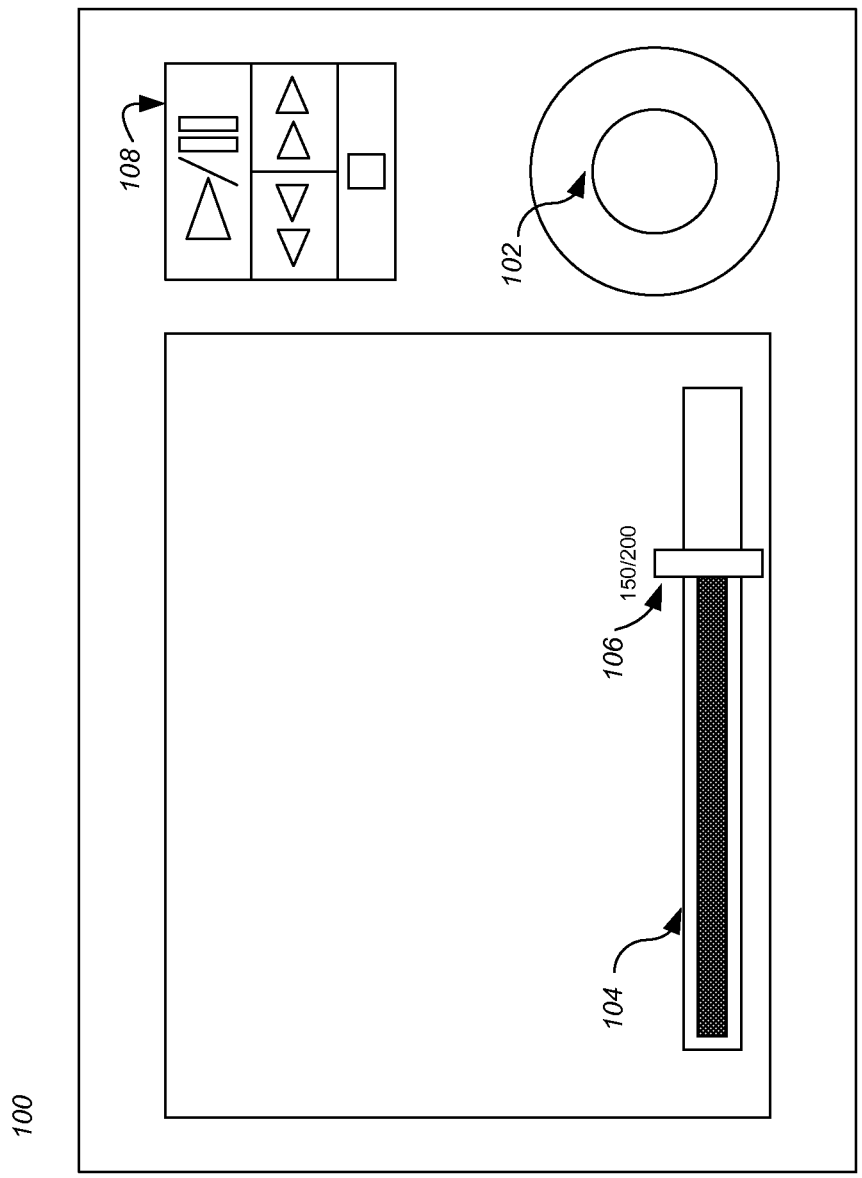
FIG. 1 is an illustration of an example user interface including a control for a meta-parameter.

FIG. 1 is an illustration of an example user interface 100 including a control for a meta-parameter. A meta-parameter is an amalgamation of two or more parameters. The user interface 100 provides for an input adjusting a value for the meta-parameter in order to modify an audio signal. The user interface 100 is provided, for example, as part of a system including a media player (e.g., a DVD player, a digital music player, or a radio).

The user interface 100 includes a meta-parameter control 102, a meta-parameter bar 104, and a meta-parameter indicator 106. The user interface 100 also includes a control panel 108 with a play/pause button, a replay track button, a skip track button, and a stop button. The meta-parameter control 102 is a control that can be presented as a standard volume control in a media player. By extending the range further than the typical "0" to "100" (or similar scales), a new range can offer further audio processing capabilities. In particular, different portions of the scale can be mapped to different audio parameters.

The meta-parameter control 102 can be mapped to more than one parameter. For example, the meta-parameter can be mapped to two parameters, a first parameter setting a loudness level, or volume, and a second parameter setting a bound of amplification for the signal for dynamic processing. Other parameters can include equalizer settings, (e.g., gain range for low and high frequencies), compression parameter settings, (e.g., attack and release times), and different bands using equalizer settings (e.g., upper bound maximum amplification and reference level for each band). Multiple parameters can be mapped to the meta-parameter control 102. Likewise, each mapped parameter can belong to one or more digital signal processing techniques and each mapped parameter can have different ranges within the range indicator 104.

As shown in FIG. 1, the meta-parameter control 102 can have a range. For example, the range can extend from A1 to B1. The meta-parameter control 102 can control a number of N parameters corresponding to M digital signal processing techniques. The system can modulate the first parameter by the identified volume range of [A1, B1]. For example, the identified volume range can be normalized to x=[0, 1] and modulate the first parameter linearly. Alternatively, the identified volume range can modulate the first parameter with any function between the minimum and maximum ranges following the formula: y=y_min×(y_max−y_min. Likewise, the identified volume range can modulate the first parameter using non-linear or mapping techniques. An identified volume range of [A2, B2]<[A1, B1] can control the first parameter. Each parameter can also be modified and scaled by individual ranges.

In some implementations, each parameter has its own sub-range within the meta-parameter range. For example, the second parameter range can begin at "100" to initiate dynamic processing. Likewise, in some other implementations, one parameter can be mapped to begin at 80, and another parameter can be mapped to begin at 120. In some implementations, the mapping is accomplished within the original range ("0" to "100") of the media player. Other ranges of the meta-parameter can be used for controlling various numbers of parameters.

As shown in FIG. 1, the meta-parameter indicator 106 is set to "150" out of a range of "0" to "200" on the meta-parameter bar 104. In some implementations, the meta-parameter indicator 106 displays multiple colors, e.g., red for the first parameter, green for the second parameter, and blue for a third parameter. Alternatively, the meta-parameter bar 104 can be configured to only display the meta-parameter level. In some implementations, the user interface 100 does not include the meta-parameter bar 104 or the meta-parameter indicator 106. For example, the user interface 100 can have a meta-parameter control 102 with no screen display showing the meta-parameter value. Likewise, the meta-parameter control 102 can be represented by various elements in the user interface 100, e.g., a slider, a knob, a dial, up and down arrows. The meta-parameter can be a physical element on the user interface 100 (e.g., button, knob, or dial) or a graphical element on the display screen, (e.g., computer display controls, touch screen, or slider). The meta-parameter control 102 can be implemented during playback of the audio signal. Alternatively, the meta-parameter control 102 can be implemented before the audio signal is played, or the meta-parameter control 102 can be implemented while the audio signal is not being played, e.g., the audio signal has been stopped or paused.

Figure 2:
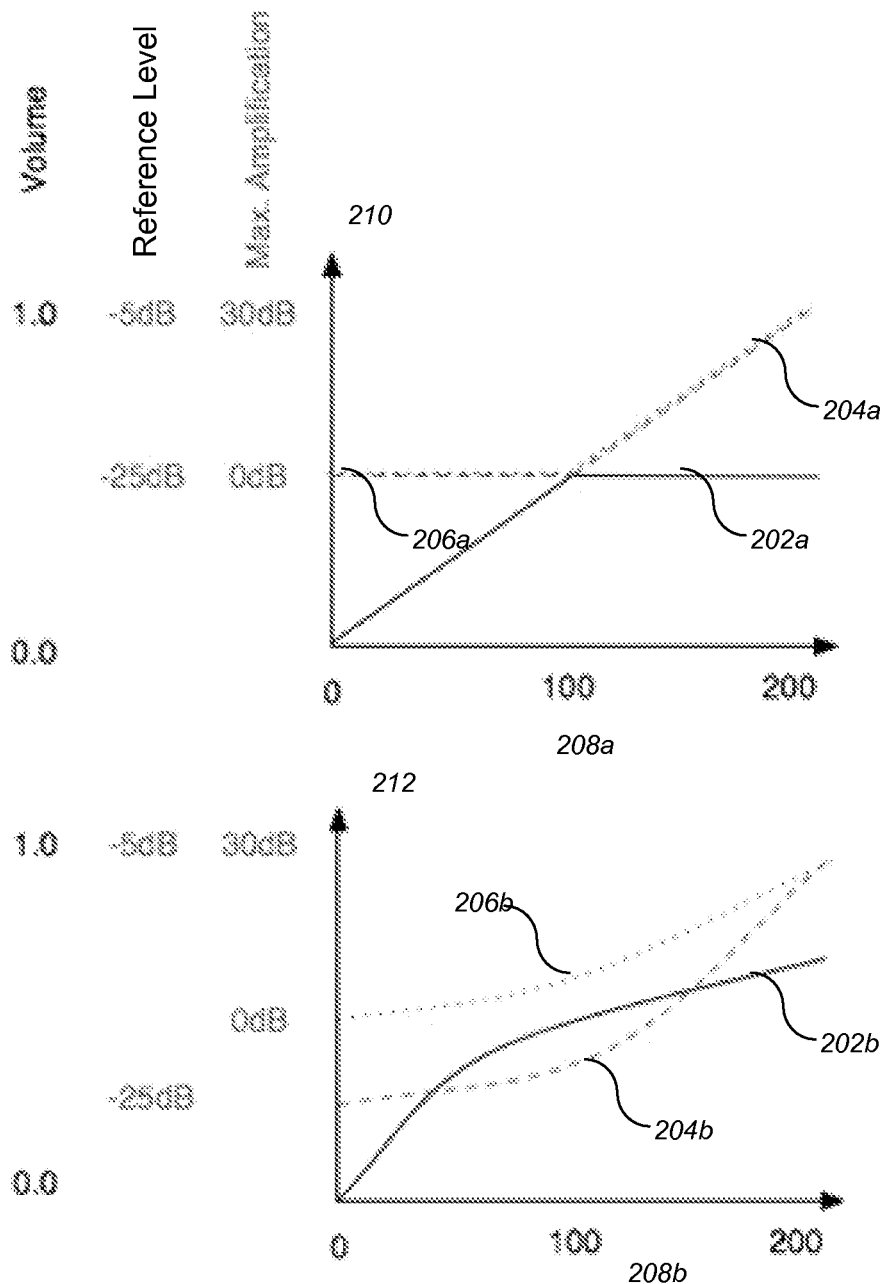
FIG. 2 is a graphical representation of an example meta-parameter and the effect of the meta-parameter on three parameters.

FIG. 2 is a graphical representation of an example meta-parameter and the effect of the meta-parameter on three parameters. A first graph 210 and second graph 212 display implementations of the meta-parameter using different functions to determine volume 202a-b, reference level 204a-b, and maximum amplification 206a-b. The x-axes provide meta-parameter scales 208a-b ranging from "0" to "200." The y-axes provide ranges for volume from "0.0" to "1.0," for a reference level from −25 dB to −5 dB, and for maximum amplification from 0 dB to 30 dB.

In the first graph 210, the meta-parameter scale 208a from "0" to "100" shows a linear progression for volume 202a, where both reference level 204a and maximum amplification 206a remain constant at the minimum levels. In some implementations, such a representation indicates that a system receiving the meta-parameter input did not have any processing in reference to the second or third parameters. The meta-parameter scale 208a from "100" to "200" shows a linear progression for reference level 204a and maximum amplification 206a, but volume 202a remains constant at a midway between the maximum "0.0" and "1.0." This function can indicate that the system receiving the meta-parameter can process the signal so that the reference level of softer sounds and the maximum amplification can increase linearly as the meta-parameter scale 208a increases.

The second graph 212 displays a different progression for the functions determining the three parameters as the meta-parameter scale 208b increases from "0" to "200." In FIG. 2, the volume 202b increases in a manner similar to exponential recovery. The reference level 204b provides more of an exponential growth, where the maximum amplitude 206b has a more linear progression.

Figure 3:
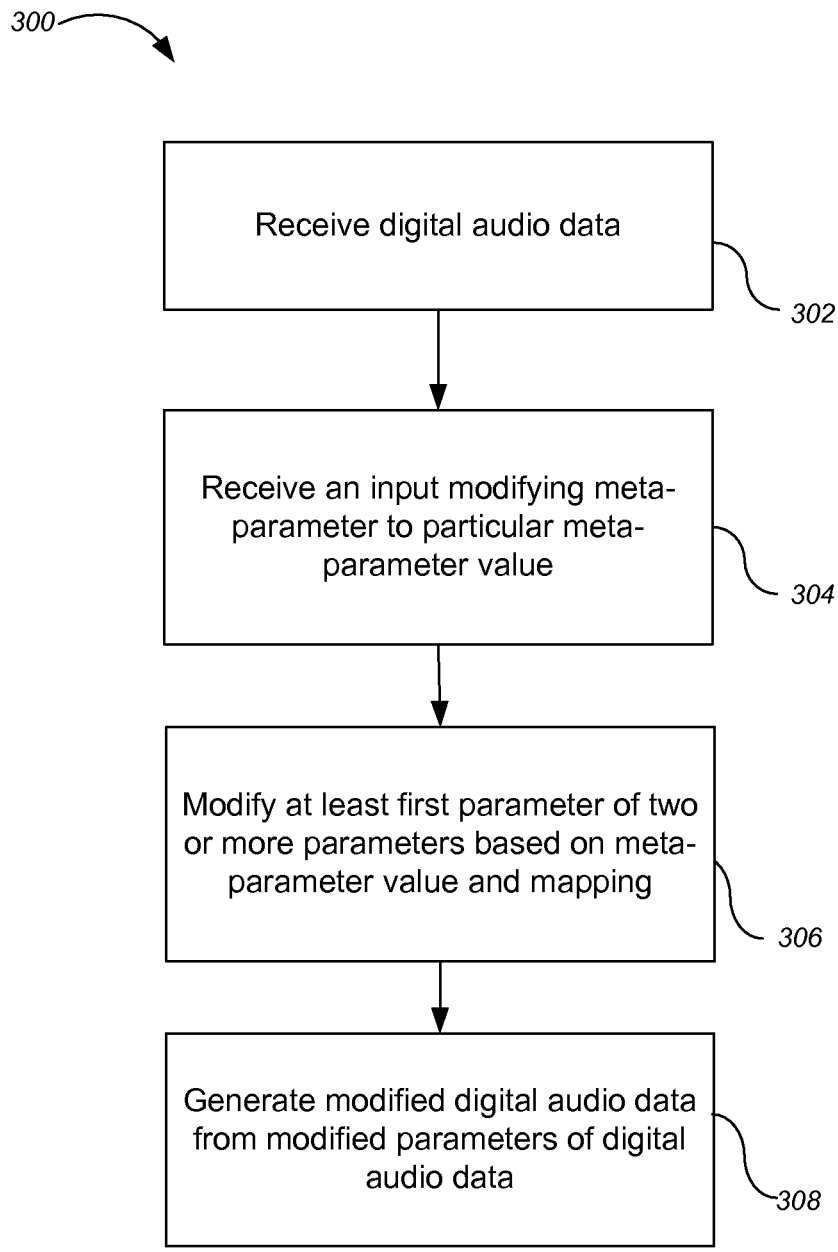
FIG. 3 is a flow chart of an example method for modifying digital audio data using a meta-parameter.

FIG. 3 is a flow chart of an example method 300 for modifying digital audio data using a meta-parameter. For convenience, the method 300 will be described with respect to a system that performs the method 300.

The system receives 302 digital audio data, the audio data can be use to generate an audio signal, e.g., the audio signal described in FIG. 1. The system can receive the digital audio data, for example, as part of a file (e.g., an audio file or other file including embedded audio including, for example, a WAV, digital video (DV), or other audio or video file). The file can be locally stored or retrieved from a remote location, including as an audio or video stream. The system can receive the digital audio data, for example, in response to a user selection of a particular file (e.g., an audio file having one or more tracks of digital audio data). A track is comprised of multiple audio signals, usually having a finite length and including at least one distinct channel. For example, a track can be digital stereo audio data contained in an audio file, the track having a specific length (e.g., running time), that is included in an audio mix (e.g., a combination of tracks, mixed audio data) by assigning a specific start time and other mixing parameters.

The system receives 304 an input modifying a meta-parameter to a particular meta-parameter value. For example, the meta-parameter can be associated with two or more parameters according to a particular mapping. Each of the two or more parameters is associated with the digital audio data, e.g., dynamic compression, volume, frequency. The meta-parameter can linearly map a first parameter, e.g., volume control. Thus, as a value of the meta-parameter is increased within the mapped range, the first parameter increases by a corresponding amount. Alternatively, a second parameter, e.g., dynamic compression, can be mapped so that the parameter value is applied to the digital audio data according to a function that can account for factors including remaining headroom or ambient noise. A user can provide the input for the two parameters using a single user interface control. For example, the system can receive the input through a user interface, as shown in FIG. 1 with a meta-parameter control 102.

The system modifies 306 at least a first parameter of the two or more parameters based on the meta-parameter value and the mapping. In some implementations, first range of values for the meta-parameter is mapped to the first parameter, and a second range of values for the meta-parameter can be mapped to the second parameter. As discussed above with respect to FIG. 1, each parameter can have its own sub range within the meta-parameter range. A first meta-parameter value can cause a modification of the first parameter associated with a volume control of the digital audio data. Likewise, a second meta-parameter value causes a modification of a second parameter of the two or more parameters associated with dynamic range control of the digital audio data. For example, the second meta-parameter value range can be associated with upward compressing of the digital audio data.

The meta-parameter mapping to the two parameters can be described as follows. First, the first parameter range can be set from "0" to "100," and the second parameter range can be set from "100" to "200." The user can provide an input for the meta-parameter. For example, the input can give the meta-parameter a value of "50." The value of "50" is mapped to the first parameter and the digital audio data is amplified according to the setting for the first parameter within the first parameter range. In some implementations, the input value of "50" corresponds to an amplification of half of the available power for the digital audio data. In another scenario, the system receives an input of "150." This setting for the meta-parameter can be mapped to the second parameter so that the system performs upward compression on the digital audio data when the digital audio data amplitude is −15 dB or less of the available power for an audio signal. This setting can be used, for example, when the viewers are trying to hear softer dialogue during a movie while refraining from amplifying louder sections of the movie (e.g., the explosions in an action sequence). In another example, the setting can be used to reduce the sound of commercials in television programming or radio programming while allowing listeners to hear dialogue in a program.

Upward compression can increase the amplification of the digital audio data below a specified threshold while louder passages of the digital audio data remain unchanged (i.e., those portions are not amplified). In some implementations, an upward compression technique can include any RMS level detection. For example, an RMS level can be determined converting the digital audio data into the power domain, then summing the converted data in the power domain. Using a sum of energy in the converted digital audio data, this technique provides the digital audio data's RMS level. If the meta-parameter value falls below a given reference level for the second parameter, the system can amplify the digital audio data by a certain amount. This amplification can reduce the dynamic range of the digital audio data because the lowest amplifications, or soft sounds, are now increased. If the meta-parameter value stays above the second parameter reference level, the system can maintain the digital audio data in its original state to keep the original dynamic in the digital audio data. The system can limit amplification gain to avoid distortion from over-amplification. Limiting amplification can also reduce clipping, or instances where the digital audio data exceeds a threshold, e.g., the capacity of speakers to output a level of power in the digital audio data.

The digital audio data can be further processed using digital signal processing. For example, a peak limiter can detect and remove any possible clippings in the digital audio data. In some implementations, the system can implement the peak limiter can so that over-compression and squashing, or amplifying smaller portions of the digital audio data more than larger portions of the digital audio data, is reduced. For example, the system can use look-ahead limiting, reviewing data from the digital audio data prior to the signal being played so that the system can determine which process to perform on the digital audio data and create smoother transitions between shifts in the digital audio data.

The system generates 308 modified digital audio data from the modified parameters of the digital audio data. Once the digital audio data has been modified according to the meta-parameter, the system can transmit the modified digital audio data to the speakers of the laptop. In another implementation, the system transmits the modified digital audio data to a user device from a centralize server. Similarly, the system can store the modified digital audio data for later use on a computer-readable storage medium. For example, the modified digital audio data can be stored on a server, a CD, a DVD, a flash drive, a mobile device, a personal computer, or a server.

Figure 4:
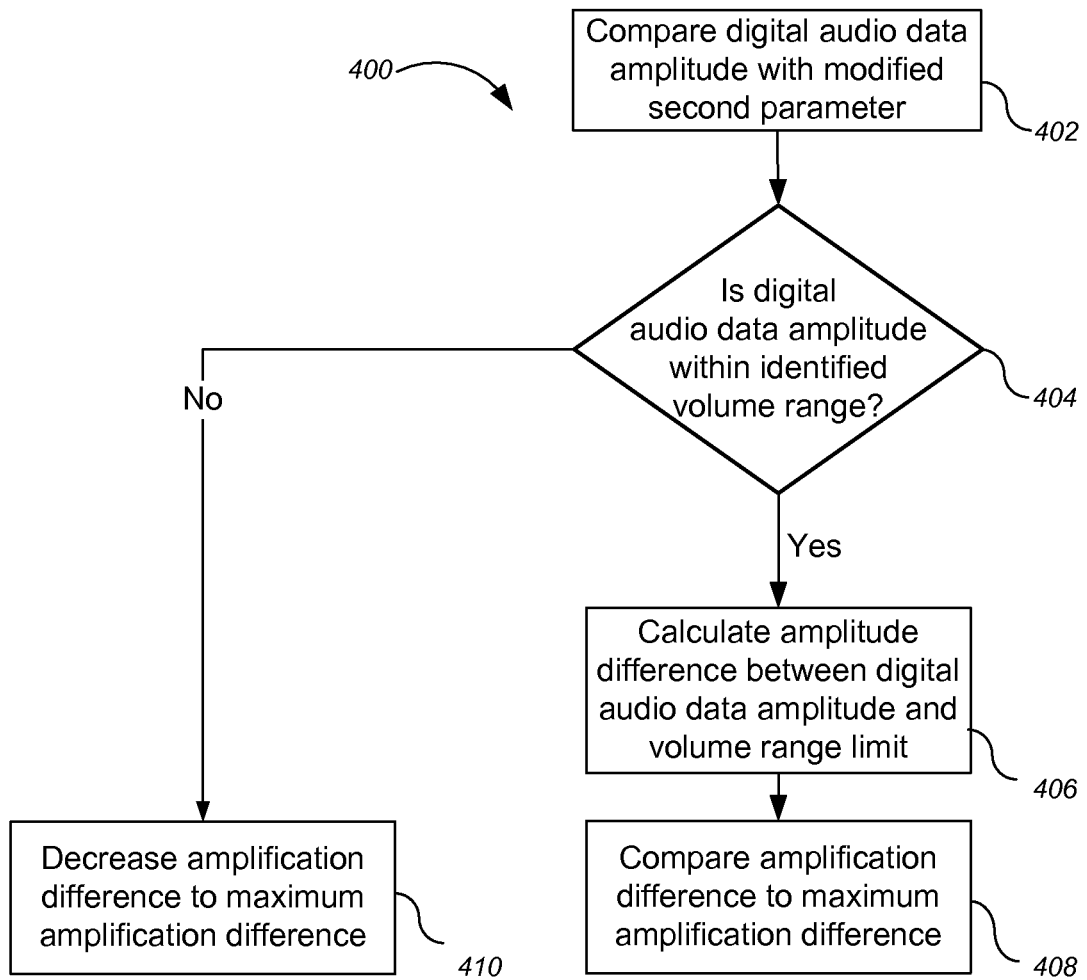
FIG. 4 is a flow chart of an example method for upward signal compression.

FIG. 4 is a flow chart of an example method 400 for upward signal compression. For convenience, the method 400 will be described with respect to a system that performs the method 400.

The system compares 402 an amplification of digital audio data with the modified second parameter. For example, the system can set the modified second parameter to "100" and the digital audio data can be below that range. Alternatively, the system can allow a user to access individual ranges for each parameter. For example, if the user wants to change the range of the second parameter, "advanced controls" can be presented to the user. The user can use the advanced controls to set ranges. The user can then use the meta-parameter to control the digital audio data after the second parameter range is changed.

The system determines 404 whether the digital audio data amplification is within the identified volume range. If the system determines the digital audio data amplification is within the identified volume range, the system calculates 406 an amplification difference between the digital audio data amplification and the modified second parameter. The system then compares 408 the amplification difference to a maximum amplification difference.

If the system determines 404 the digital audio data amplification is greater than the maximum amplification difference, the system decreases 410 the amplification difference to the maximum amplification difference. For example, if the digital audio data has a quiet string section on a musical track, that data may have a very low amplification. The system can generate a large amplification difference between the digital audio data amplification and the modified second parameter. Using the amplification difference, however, may increase the amplification of the string section such that the result is unpleasant for a listener. Thus, a maximum amplification difference limiting the amplification of the digital audio data can provide a cut-off for amplification.

In some implementations, the system can process the digital audio data further using digital signal processing techniques. For example, the system can detect clippings from the adjusted digital audio data amplification. Likewise, the system can convert the amplification difference from a log scale to a linear scale to smooth an amplitude envelope of the digital audio data. The system can also apply look-ahead limiting to the adjusted digital audio data amplification. For example, if the digital audio data is stored on a classical music CD, the system can look through the track on the CD before processing or playing any of the CD. Alternatively, if the digital audio data is a conference call, the necessity for short latency requires a shorter look-ahead data set for the system.

In some implementations, the system uses an upward compression technique as outlined below:

```
measured_level_RMS_dB = detect_rms(x_n)
if measured_level_RMS_dB < reference_level_dB
    g_boost_dB = reference_level_dB – measured_level_RMS_dB
    if g_boost_dB > g_boost_max_dB
        g_boost_dB = g_boost_max_dB
        g_boost = attack_release_dB_to_lin(g_boost_dB, true)
        y_n = g_boost * x_n
else
    g_boost_dB = 0
    g_boost = attack_release_dB_to_lin(g_boost_dB, false)
    y_n = g_boost * x_n
```

The compression technique above provides the system with various elements to modify the digital audio data using upwards compression. First, in "measured_level_RMS_dB=detect_rms(x_n)," the system determines the RMS of the digital audio data in decibel (dB) format. The system then determines if the RMS of the digital audio data is less than a reference level representing the lowest portion of the modified second parameter, "if measured_level_RMS_dB<reference_level_dB." If the RMS of the digital audio data is less than the reference level, the system determines the amplification difference, "g_boost_dB=reference_level_dB−measured_level_RMS_dB," comparing the reference level to the RMS of the digital audio data.

The system can then compare the amplification difference to a maximum amplification difference, "if g_boost_dB>g_boost_max_dB," and decrease the amplification difference to match the maximum application difference, "g_boost_dB=g_boost_max_dB," if the amplification difference is greater than the maximum amplification difference. The technique next provides that the system create an amplification value linearly based on the amplification difference, "g_boost=attack_release_dB_to_lin(g_boost_dB, true)," and applies the amplification value to the digital audio data, "y_n=g_boost*x_n." The system can also apply an attack time to transition the change in amplification.

If the RMS of the digital audio data is not less than a reference level representing the lowest portion of the modified second parameter, the system can set the amplification difference to zero, "g_boost_dB=0," and the amplification value is set to 1, "g_boost=attack_release_dB_to_lin(g_boost_dB, false)." The system can apply a release time if the sound is not less than the reference level such that the system stops compressing the signal. Thus, the digital audio data remains unchanged, "y_n=g_boost*x_n."

Another implementation of a technique for upward compression can address settings such as television programming with louder commercials and softer television programs. For example, the technique outlined below is one implementation:

```
g_boost_dB = 0
measured_level_RMS_dB = detect_rms(x_n)
if measured_level_RMS_dB < reference_level_dB
    g_boost_dB = reference_level_dB – measured_level_RMS_dB
if measure_level_RMS_dB > reference_high_level_dB
    g_boost_dB = reference_high_level_dB –
    measure_level_RMS_dB
if g_boost_dB != 0
    if g_boost_dB > g_boost_max_dB
        g_boost_dB = g_boost_max_dB
    g_boost = attack_release_dB_to_lin(g_boost_dB, true)
    y_n = g_boost * x_n
else
    g_boost = attack_release_dB_to_lin(g_boost_dB, false)
    y_n = g_boost * x_n
```

The technique above has two reference levels: the reference level discussed in the previous example and "reference_high_level_dB." This second reference level is a second threshold that represents a maximum level, e.g., the maximum amplitude that the technique does not process. If the RMS of the digital audio data is above this maximum amplitude, the system implements the technique so that the digital audio data is processed using downward compression.

Figure 5:
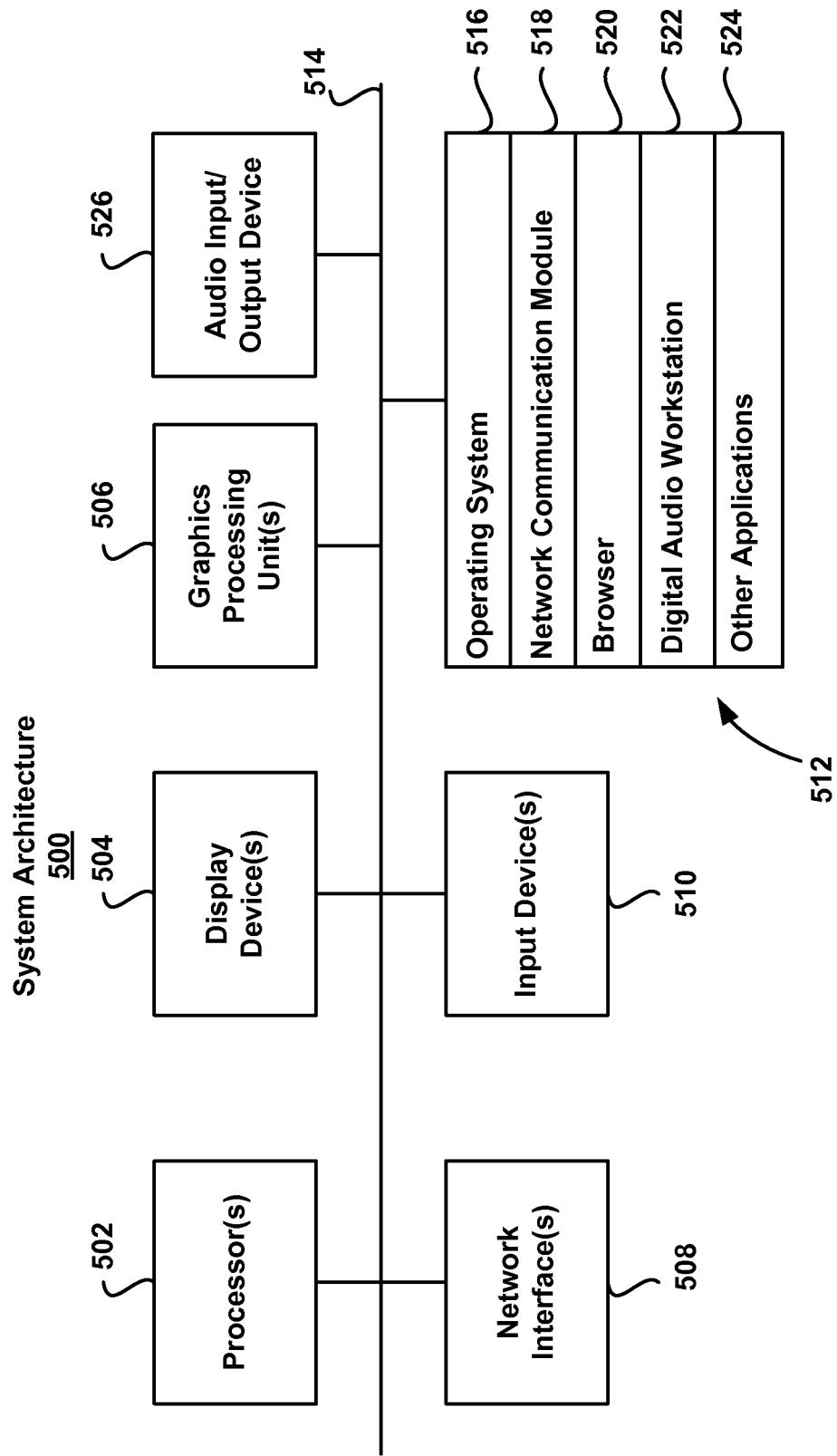
FIG. 5 is a block diagram of an exemplary user system architecture.

FIG. 5 is a block diagram of an exemplary user system architecture 500. The system architecture 500 is capable of hosting an audio processing application that can electronically receive, display, and edit one or more audio signals. The architecture 500 includes one or more processors 502 (e.g., IBM PowerPC, Intel Pentium 4, etc.), one or more display devices 1404 (e.g., CRT, LCD), graphics processing units 506 (e.g., NVIDIA GeForce, etc.), a network interface 508 (e.g., Ethernet, FireWire, USB, etc.), input devices 510 (e.g., keyboard, mouse, etc.), and one or more computer-readable mediums 512. These components exchange communications and data using one or more buses 514 (e.g., EISA, PCI, PCI Express, etc.).

The term "computer-readable medium" refers to any medium that participates in providing instructions to a processor 502 for execution. The computer-readable medium 512 further includes an operating system 516 (e.g., Mac OS®, Windows®, Linux, etc.), a network communication module 518, a browser 520 (e.g., Safari®, Microsoft® Internet Explorer, Netscape®, etc.), a digital audio workstation 522, and other applications 524.

The operating system 516 can be multi-user, multiprocessing, multitasking, multithreading, real-time and the like. The operating system 516 performs basic tasks, including but not limited to: recognizing input from input devices 510; sending output to display devices 504; keeping track of files and directories on computer-readable mediums 512 (e.g., memory or a storage device); controlling peripheral devices (e.g., disk drives, printers, etc.); and managing traffic on the one or more buses 514. The network communications module 518 includes various components for establishing and maintaining network connections (e.g., software for implementing communication protocols, such as TCP/IP, HTTP, Ethernet, etc.). The browser 520 enables the user to search a network (e.g., Internet) for information (e.g., digital media items).

The digital audio workstation 522 provides various software components for performing the various functions for amplifying the primarily dominant signal in a audio data file, as described with respect to FIGS. 1-3 including receiving digital audio data, receiving an input modifying a meta-parameter to a particular meta-parameter value, modifying a first parameter of two or more parameters based on the meta-parameter value, and generating modified digital audio data from the modified parameters of the digital audio data. The digital audio workstation can receive inputs and provide outputs through an audio input/output device 626.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method, comprising:
   receiving digital audio data;
   receiving, through a user interface, one or more inputs to a single meta-parameter control, the single meta-parameter control enabling adjustment of a meta-parameter value across a scale of meta-parameter values, the one or more inputs modifying the meta-parameter value that is mapped to two or more parameters associated with the digital audio data, the two or more parameters comprising a first parameter associated with a volume control of the digital audio data and a second parameter associated with compression of the digital audio data;
   responsive to receiving the one or more inputs to the single meta-parameter control, modifying the meta-parameter value effective to modify at least one of the two or more parameters associated with the digital audio data; and
   processing the digital audio data based on the at least one modified parameters associated with the digital audio data to generate modified digital audio data.

2. The computer-implemented method as recited in claim 1, further comprising:
   comparing an amplitude of the modified digital audio data with the modified second parameter associated with the compression of the digital audio data;
   in response to the amplitude of the digital audio data being within a range of the scale of the meta-parameter values, calculating an amplification difference between the amplitude of the digital audio data and the modified second parameter;
   comparing the amplification difference to a maximum amplification difference; and
   in response to the amplification difference being greater than the maximum amplification difference, decreasing the amplification difference to the maximum amplification difference.

3. The computer-implemented method as recited in claim 2, further comprising detecting clippings from the modified digital audio data.

4. The computer-implemented method as recited in claim 3, further comprising smoothing an amplitude envelope of the modified digital audio data.

5. The computer-implemented method as recited in claim 3, further comprising applying look-ahead limiting to the amplitude of the modified digital audio data.

6. A hardware computer-readable storage memory comprising stored instructions that are executable and, responsive to execution of the instructions by a computing device, the computing device performs operations comprising to:
   receive one or more inputs to a single meta-parameter control displayed on a user interface, the single meta-parameter control enabling adjustment of a meta-parameter value across a scale of meta-parameter values, the scale of meta-parameter values being mapped to two or more parameters associated with digital audio data, a first parameter associated with a volume control of the digital audio data and a second parameter associated with compression of the digital audio data;
   responsive to receiving the one or more inputs to the single meta-parameter control, modify the meta-parameter value effective to modify the first parameter that is associated with the volume control and the second parameter that is associated with compression of the digital audio data based on the modified meta-parameter value; and
   process the digital audio data based on the modified first parameter and second parameter to generate modified digital audio data.

7. The hardware computer-readable storage memory as recited in claim 6, wherein the computing device performs the operations further comprising to:
   compare an amplitude of the modified digital audio data with the modified second parameter associated with the compression of the digital audio data;
   in response to the amplitude of the digital audio data being within a range of the scale of the meta-parameter values, calculate an amplification difference between the amplitude of the digital audio data and the modified second parameter;
   compare the amplification difference to a maximum amplification difference; and in response to the amplification difference being greater than the maximum amplification difference, decrease the amplification difference to the maximum amplification difference.

8. The hardware computer-readable storage memory as recited in claim 7, wherein the computing device performs the operations further comprising to detect clippings from the modified digital audio data.

9. The hardware computer-readable storage memory as recited in claim 8, wherein the computing device performs the operations further comprising to smooth an amplitude envelope of the modified digital audio data.

10. The hardware computer-readable storage memory as recited in claim 8, wherein the computing device performs the operations further comprising to apply look-ahead limiting to the amplitude of the modified digital audio data.

11. A system, comprising:
a display device to display a user interface;
a processor and memory system to implement a computer program that is configured to:
receive one or more inputs to a single meta-parameter control displayed on the user interface, the single meta-parameter control configured to enable adjustment of a meta-parameter value across a scale of meta-parameter values, the scale of meta-parameter values being mapped to three or more parameters associated with digital audio data, a first parameter associated with a volume control of the digital audio data, a second parameter associated with compression of the digital audio data, and a third parameter associated with a frequency of the digital audio data;
responsive to receiving the one or more inputs to the single meta-parameter control, modify the meta-parameter value effective to modify the first parameter that is associated with the volume control, the second parameter that is associated with compression of the digital audio data, and the third parameter that is associated with the frequency; and
process the digital audio data based on the modified first, second, and third parameters to generate modified digital audio data.

12. The system as recited in claim 11, wherein the computer program is configured to:
compare an amplitude of the modified digital audio data with the modified second parameter associated with the compression of the digital audio data;
in response to the amplitude of the digital audio data being within a range of the scale of meta-parameter values, calculate an amplification difference between the amplitude of the digital audio data and the modified second parameter;
compare the amplification difference to a maximum amplification difference; and
in response to the amplification difference being greater than the maximum amplification difference, decrease the amplification difference to the maximum amplification difference.

13. The system as recited in claim 12, wherein the computer program is configured to detect clippings from the modified digital audio data.

14. The system as recited in claim 13, wherein the computer program is configured to smooth an amplitude envelope of the modified digital audio data.

15. The system as recited in claim 13, wherein the computer program is configured to apply look-ahead limiting to the amplitude of the modified digital audio data.

16. The computer-implemented method as recited in claim 1, wherein the single meta-parameter control is configured as one of a slider control, a knob control, or a dial control.

17. The hardware computer-readable storage memory as recited in claim 6, wherein the scale of meta-parameter values is further mapped to a third parameter associated with a frequency of the digital audio data.

18. The system as recited in claim 11, wherein the single meta-parameter control is configured as one of a slider control, a knob control, or a dial control.

* * * * *